(12) United States Patent
Blakeslee et al.

(10) Patent No.: US 7,621,113 B2
(45) Date of Patent: Nov. 24, 2009

(54) AUGER WITH TAPERED FLIGHTING

(75) Inventors: Edward A. Blakeslee, Ephrata, PA (US); Wayne D. Thaxton, Denver, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/062,638

(22) Filed: Apr. 4, 2008

(65) Prior Publication Data

US 2009/0250317 A1 Oct. 8, 2009

(51) Int. Cl.
*A01D 34/00* (2006.01)
*A01D 43/00* (2006.01)

(52) U.S. Cl. .......................................... 56/14.5; 56/153
(58) Field of Classification Search ................ 56/14.4, 56/153, 14.5, 119, 364; 198/669, 676
See application file for complete search history.

(56) References Cited

U.S. PATENT DOCUMENTS

| | | | |
|---|---|---|---|
| 1,780,481 A | 11/1930 | Hale | |
| 2,208,757 A | 7/1940 | Fitch | |
| 2,312,785 A | 3/1943 | Welty | |
| 2,477,970 A | 8/1949 | Downing et al. | |
| 2,682,948 A | 7/1954 | Millard et al. | |
| 2,946,424 A | 7/1960 | Wiegelhaus et al. | |
| 3,027,050 A * | 3/1962 | Hansen | 222/136 |
| 3,128,921 A * | 4/1964 | Henderson | 222/238 |
| 3,132,459 A * | 5/1964 | Grillot | 56/341 |
| 3,213,552 A | 10/1965 | Vanvick | |
| 3,244,271 A | 4/1966 | Wenning | |
| 3,509,699 A | 5/1970 | Calder | |
| 4,694,594 A * | 9/1987 | Thorud et al. | 37/244 |
| 5,108,040 A * | 4/1992 | Koenig | 241/260.1 |
| 5,626,218 A | 5/1997 | Kamiwaki | |
| 5,784,869 A | 7/1998 | Rayfield | |
| 6,865,871 B2 | 3/2005 | Patterson et al. | |
| 2007/0186529 A1 | 8/2007 | Rieck et al. | |
| 2007/0193243 A1 | 8/2007 | Schmidt et al. | |

FOREIGN PATENT DOCUMENTS

JP 361037628 A1 2/1986

* cited by examiner

*Primary Examiner*—Thomas B Will
*Assistant Examiner*—Joan D Misa
(74) *Attorney, Agent, or Firm*—Patrick M. Sheldrake; John William Stader; Michael G. Harms

(57) ABSTRACT

A crop conveying apparatus for laterally urging crop from outboard ends of a cutting header on an agricultural harvester toward an interior discharge zone for formation of a windrow or for feed to a subsequent crop processing apparatus. Helical flighting extending radially from a transversely disposed, rotatable central core defines a first profile for the auger apparatus adjacent each outboard end of the header and extending inwardly to a position near, but not co-extensive with the width of a crop discharge zone in the header. Auger flighting in the central portion of the header co-extensive with the width of the discharge zone opening features a variable profile that tapers from the first profile to a minimum profile centrally located between the side edges of the discharge zone opening to provide optimal movement of severed crop material into the discharge opening, resist entanglement and clogging of the crop material, and minimize the loss of seed from the crop stem.

14 Claims, 3 Drawing Sheets

AUGER WITH TAPERED FLIGHTING

BACKGROUND OF THE INVENTION

This invention relates generally to a machine for harvesting crops in a field and forming a windrow of cut crop, more particularly, to a specialized header for harvesting specialty crop with an apparatus for transversely conveying the crop material within the header without damaging the crop.

In modern crop harvesting machines, it is desirable to optimize cutting headers for specific crops in order to maximize harvesting efficiency. Such optimized headers are typically based on existing headers with specific-purpose modifications incorporated to alter finite portions of the crop flow within the header to suit the specific crop. This approach helps control production costs of the equipment and extends the life cycle of a basic header design.

One specific application involves harvesting of grasses, seed or other specialty crops having seeds on a stem which must be cut and dried in a windrow a desired amount before undertaking operations to separate the seed from the stems. Care must be taken when working with such crops to minimize disturbances to the cut crop material which results in dislodgement and loss of the seeds. A cutting header must be capable of cutting the crop from the ground and forming a windrow to allow crop drying in advance of subsequent harvesting operations. Conditioning mechanisms are omitted in the harvest of such specialty crops. Experience has shown that other changes to crop moving devices in the header are also necessary to prevent crop clogging and entanglement with the auger. Clogs result in lost harvesting productivity while an operator removes the entangled crop and also lost seed due to the increased disruption to the crop material when the entanglement begins. In many conditions, the tendency of crops to clog results in clumping in the resultant windrow which increases the difficulty of subsequent harvesting operations, such as threshing by a combine. Ground speeds must be reduced, with a resultant decrease in productivity, in order to prevent further loss of seed.

It is known to use a windrower having a header equipped with a transversely arranged auger featuring opposite-hand flighting on each end for conveying severed crop material within the header. U.S. Pat. No. 5,327,709 granted to Webb on Jul. 12, 1994 shows a typical crop severing header using a transverse feed mechanism of this type. It is noted that the auger flighting does not extend into the central section ahead of the crop discharge zone. Instead, smaller paddle structures are provided on the auger drum ahead of the discharge zone to allow the direction of crop flow to be directed rearwardly into the conditioning mechanism. Experience has shown that this same structure delivers unsatisfactory windrowing in the absence of the conditioning mechanism. Replacing the paddle structures with flighting continuing to the center of the auger has also proven unsatisfactory as it causes large clogs of crop material to form in the center of the header resulting in uneven windrows.

It would be desirable to provide a crop transport apparatus for a specialty crop header capable of conveying severed, seed-bearing crop material toward a centrally located discharge zone for formation of a windrow that would overcome the above problems and limitations.

SUMMARY OF THE INVENTION

Accordingly, it is an object of the present invention to provide a crop harvesting header which efficiently gathers severed crop from a cutterbar and conveys it to a discharge zone and there deposits the crop evenly to form a uniform crop mat for discharge to a windrow or for intake by a subsequent crop processing apparatus.

It is a further object of the present invention to provide a transversely arranged crop conveyance mechanism which conveys severed crop to a discharge zone without undue disturbance of a specialty, seed-bearing crop material which could result in seed loss.

It is a further object of the present invention to provide a transverse auger mechanism that extends substantially across the width of a header for conveying severed specialty crop material toward a central discharge zone and forms a uniform windrow.

It is a further object of the present invention to provide a transversely arranged auger mechanism for conveying severed crop material toward a central discharge zone in which auger flighting extends substantially along the entire length of the auger mechanism.

It is a still further object of the present invention to provide a transversely arranged auger mechanism for conveying severed crop material toward a central discharge zone that does not result in clogging or entanglement of the severed crop material with the mechanism.

It is a still further object of the present invention to provide a transversely arranged auger mechanism for conveying severed crop material toward a central discharge zone in which the profile of auger flighting is varied along the length of the auger mechanism to provide optimal crop material movement and configuration for discharge to a windrow or a subsequent crop processing apparatus.

It is a still further object of the present invention to opposite hand flighting on opposing ends of the auger mechanism so that severed crop material will be urged from the outboard ends of the header to a central discharge zone by a single auger mechanism rotating in a single direction.

It is yet another object of the present invention to provide a crop conveying auger having standard interface connections with existing header designs thereby enabling efficient manufacturing of specialty headers.

It is a still further object of the present invention to provide a transversely arranged crop conveyance mechanism which conveys severed crop to a discharge zone without undue disturbance of the crop material that is durable in construction, inexpensive of manufacture, carefree of maintenance, easily assembled, and simple and effective to use.

These and other objects are achieved according to the instant invention by providing a crop conveying apparatus for laterally urging crop from outboard ends of a cutting header on an agricultural harvester toward an interior discharge zone for formation of a windrow or for feed to a subsequent crop processing apparatus. Helical flighting extending radially from a transversely disposed, rotatable central core defines a first profile for the auger apparatus adjacent each outboard end of the header and extending inwardly to a position near, but not co-extensive with the width of a crop discharge zone in the header. Auger flighting in the central portion of the header co-extensive with the width of the discharge zone opening features a variable profile that tapers from the first profile to a minimum profile centrally located between the side edges of the discharge zone opening to provide optimal movement of severed crop material into the discharge opening, resist entanglement and clogging of the crop material, and minimize the loss of seed from the crop stem.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
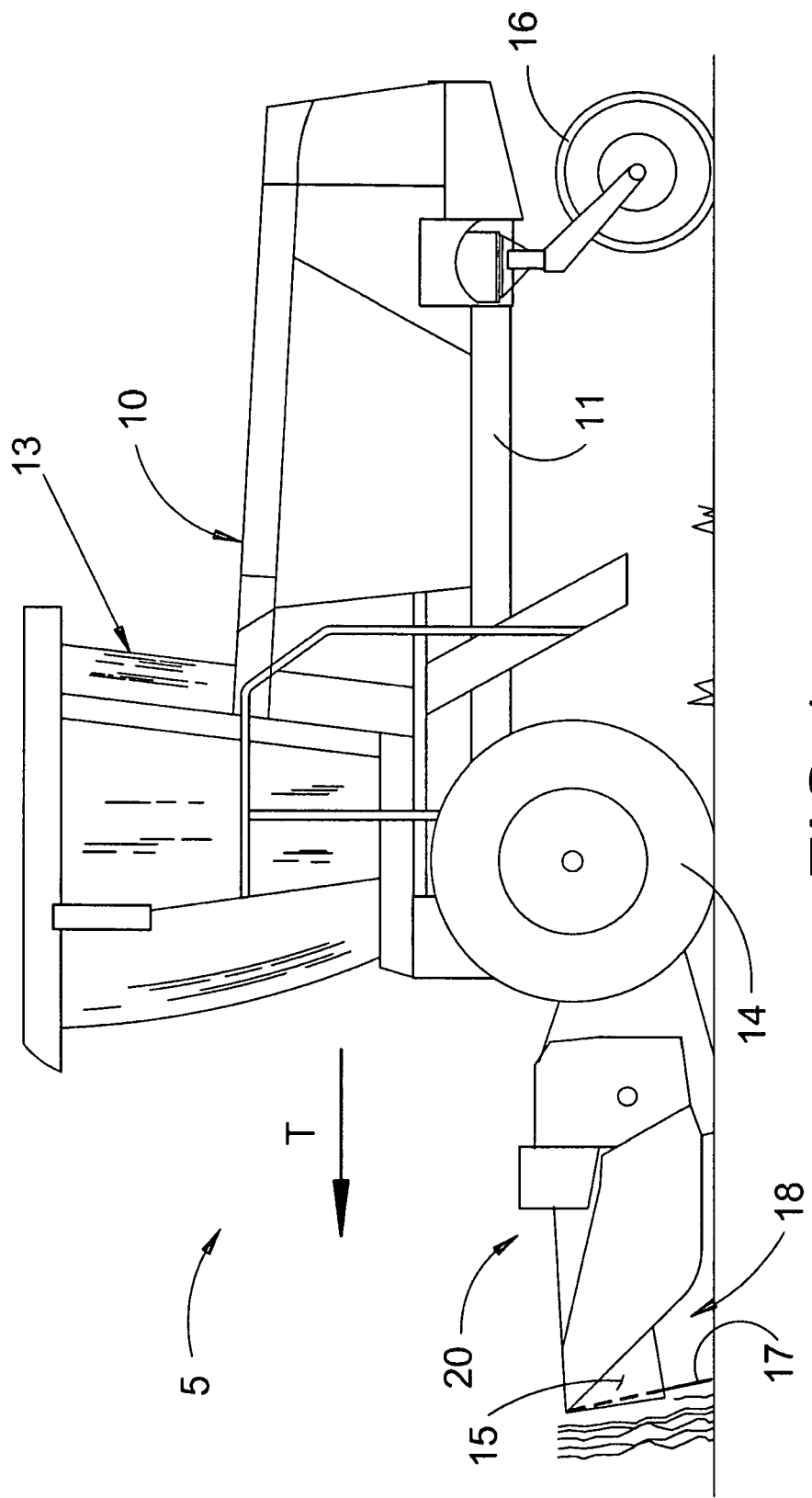
FIG. 1 is a side elevation view of a typical agricultural windrower suitable for fitment with a specialty cutting header of the type on which the present invention is useful.

FIG. 1 shows a side view of a typical self-propelled windrower 5 used for harvesting a standing crop as it travels forwardly across the ground in the direction indicated by arrow "T." Usually, a tractor 10 pushes a header 20 which severs the crop material from the ground by a sickle-bar, rotary cutter or other functionally equivalent cutting means arranged along the forward edge of the header 20. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material is urged toward the center of the header by a transversely arranged crop conveyance means. The crop is then ejected rearwardly from the header 20, generally in the space between the drive wheels 14, through a centrally positioned crop discharge zone whereupon it falls to the ground in a windrow. Alternatively, additional crop processing apparatus, such as conditioner rolls, may be positioned to receive crop from the discharge zone, process the crop material, and then discharge to the ground in the form of a windrow. Shields (not shown) are used to arrange the windrow into a desired uniform configuration generally trailing along the longitudinal axis of the windrower.

The general operation and construction of windrowers of the type on which the present invention may find utility can be found in U.S. Pat. Nos. 5,327,709, issued on Jul. 12, 1994, to Webb, 6,073,431, issued on Jun. 13, 2000, to Osborne et al., and 6,662,539, issued on Dec. 16, 2003 to Adams et al., the descriptive portions of which are incorporated herein by reference.

Figure 2:
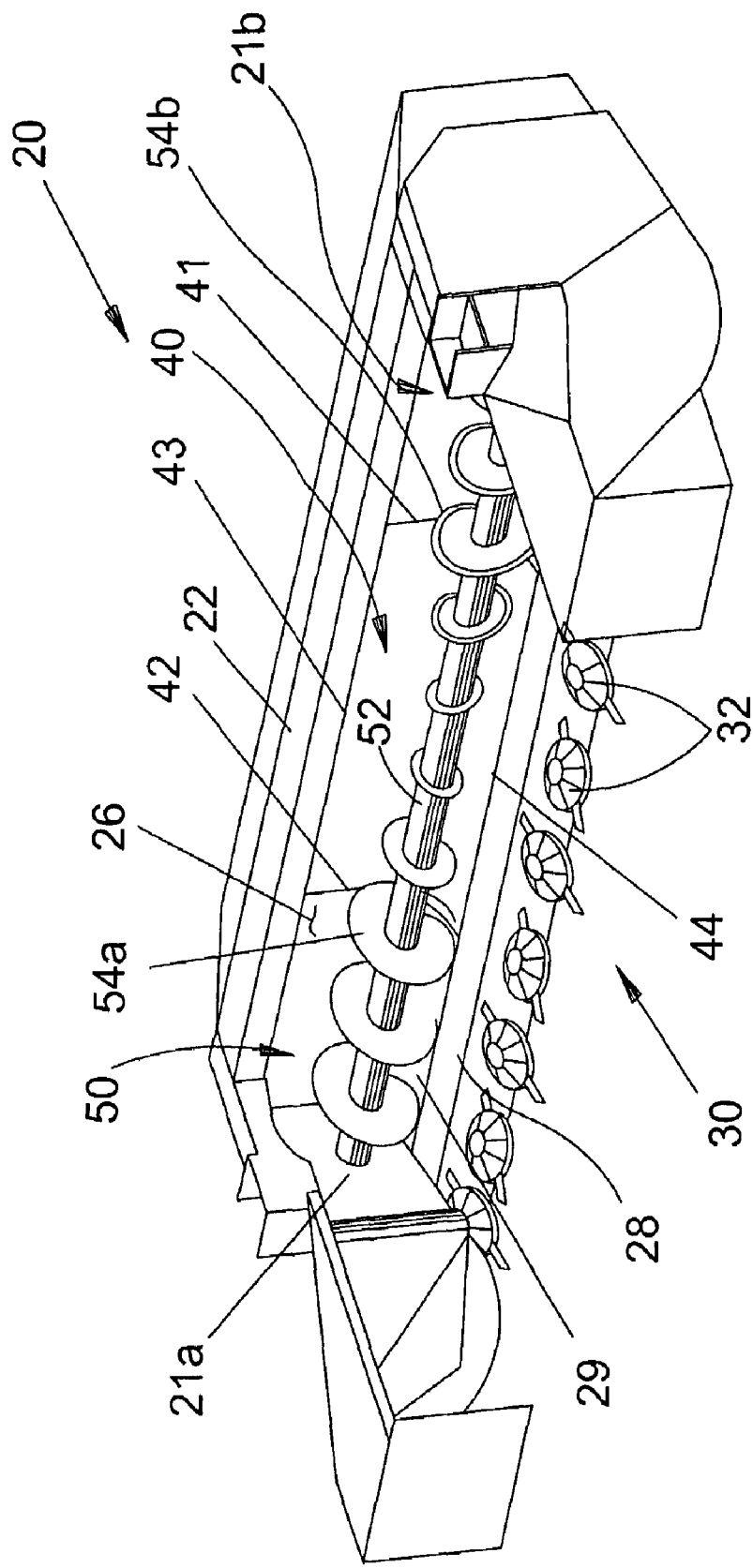
FIG. 2 is a partial perspective view of a specialty cutting header incorporating a first embodiment of the present invention.

Now referring to FIG. 2, wherein a cutting header 20 is presented having generally opposing side walls 21 generally defining the header width connected by a transverse frame 22. Cutterbar 30 extends across the forward edge of the header 20 for substantially the entire width of the header to sever standing crop and form a consolidated windrow. Cutterbar 30 is powered by the prime mover by well-known means, with the final power delivery means generally being a rotating shaft located at one end of the cutter bar. Wider cutterbars may feature drive shafts at each end of the cutterbar.

A crop discharge opening 40 is provided in the rearward portion of the header allowing severed crop material to be discharged rearwardly to form a windrow. The discharge opening 40 allows crop to pass through the header rear panel 26 and is laterally bounded by a pair of side edges 41, 42 and vertically by top edge 43 and bottom edge 44. Bottom edge 44 may be located in the lower horizontal floor 28 portion of the header to allow a larger discharge opening 40 to be provided. As is common in modern cutting headers, the width of the cutterbar 30 is substantially greater than the width of the discharge opening 40 as the discharge opening width must be limited for proper windrow formation. As the severed crop material enters the header, a transverse crop conveyor 50 interacts with the crop material and the surrounding structure of the header, typically a trough-like structure 29, to urge the crop material toward the much narrower discharge opening 40.

While a rotary-type cutterbar 30 is shown in FIG. 2 featuring a plurality of rotary cutters 32, one skilled in the art will recognize that other type of crop severing apparatus, such as a sickle cutterbar, would be equally functional subject to similar crop movement issues involving a cutting width that substantially exceeds the width of the discharge opening. The present invention may also provide utility when used with such alternate cutterbars.

In a conventional cutting header in which a conditioning apparatus positioned immediately behind the discharge opening receives the severed crop material, the action of the conditioner rolls aides in pulling crop material from the header as it converges near the center of the header. In such headers, it is common for the helical flighting used to move crop material axially along the transverse conveyor to be absent from the central portion of the crop conveyor 50 ahead of the conditioner intake area. In lieu of the flighting, paddles or similar structures that urge the crop material tangentially as the conveyor assembly rotates are employed to transition crop motion from a transverse direction within the header to a longitudinal direction for rearward discharge. The transitional movement in conjunction with the crop movement provided by the conditioning apparatus is sufficient to form uniform windrows. In the absence of a conditioner apparatus, the conventional crop conveyor described produces a windrow that lacks sufficient uniformity to provide efficient crop drying.

Figure 3:
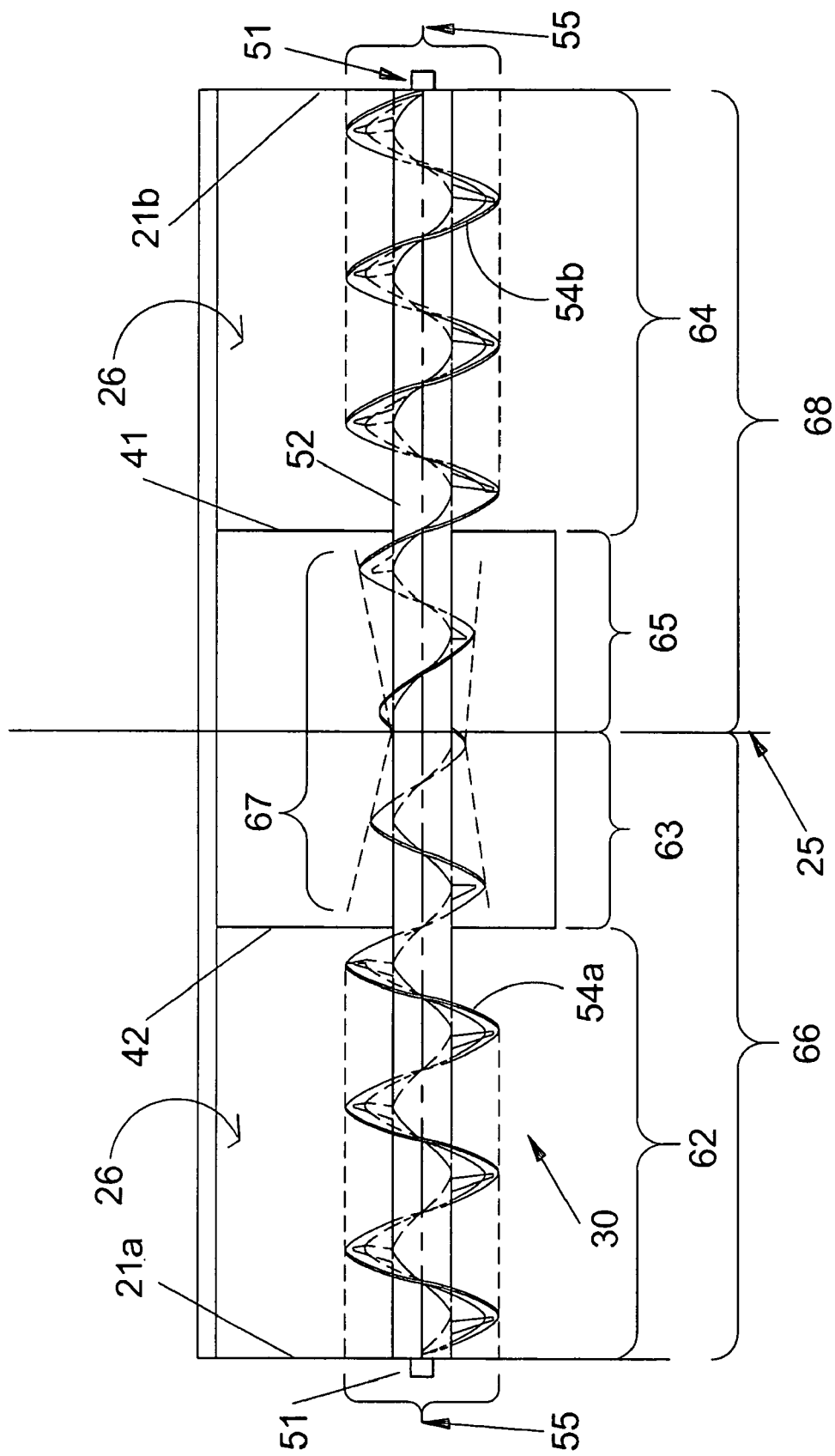
FIG. 3 is a elevation view of a first embodiment of the transverse auger showing the variation of the flighting profile along the length of the auger mechanism.

Referring now to FIGS. 2 and 3, transverse crop conveyor 50 is an elongate structure rotatably connected to the header 20 by end connections 51 which may be in the form of bearings or equivalent means supported by the header side walls 21. Conveyor 50 is formed from a central core 52 about which helical flighting 54 is connected and radially extends to form an auger or screw conveyor. Conveyor 50 includes a first portion 66 extending between side wall 21*a* to at least a mid-point 25 having left-handed helical flighting 54*a* axially co-extensive of the length of first portion 62. A second portion 68 of conveyor extends from the opposite side wall 21*b*, extends to at least mid-point 25 where it overlaps with the flighting of first portion 66, and features right-handed flighting 54*b* axially co-extensive of the length of second portion 68. The use of opposite-hand flighting on the opposing ends of conveyor 50 causes crop material to be urged axially along the conveyor 50 from the outboard ends of the conveyor, adjacent the side walls 21*a*, 21*b*, toward the midpoint 25 as the conveyor 50 rotates.

Axial movement of crop material is managed by variations in the height of the flighting to promote uniformity in the resultant windrow. Flighting 54*a*, 54*b* on the first and second portions extends radially from central core 52 to define a first profile 55 having a diameter. The diameter of first profile 55 is generally constant along the axial portions of the conveyor positioned outboard of discharge opening 40, shown as first profile sections 62, 64 in FIG. 3. In one embodiment, the diameter of first profile 55 is approximately twenty inches and includes a central core 52 with a diameter of approximately six inches. The flighting profile in the central section 67 of the conveyor 50 forwardly adjacent to discharge opening 20, shown as including tapered profile sections 63, 65 in FIG. 3, is tapered such that the radial extension of the flighting decreases as it approaches mid-point 25.

A taper ratio, defined as the ratio between the first profile diameter 55 and the minimum flighting diameter at the midpoint 25, thus controls the degree of axial crop movement caused by the auger. The radial extension of the flighting generally decreases to approximately zero at an axial position beyond the mid-point. There is thus a portion of the central section in which the flighting from each end of the auger overlaps. In one embodiment, the flighting extends radially from the drum for approximately two inches at the mid-point on the auger, yielding an overall profile diameter at the auger mid-point of approximately half of the profile diameter at the ends, resulting in a taper ratio of two-to-one. The configuration results in a gradual decrease in amount of crop material being urged toward the mid-point 25 yet still provide inward axial urging in both direction at the mid-point of the auger. This precludes a void or gap in the center of the resultant crop mat exiting the discharge opening 40 and promotes a more uniform distribution of crop material across the width of the resultant windrow. In contrast, use of opposite-hand flighting having a uniform profile across the entire conveyor width which converges at a mid-point results in excess crop material at the mid-point which can clog the discharge opening and lead to an area of non-uniformity crop density in the center of the resultant windrow.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A crop conveying auger for moving severed crop material transversely in a specialty crops header on an agricultural crop harvester, the specialty crops header not having a conditioner roll located rearward of the crop conveying auger with respect to the direction of travel, the header having generally opposing outboard sides defining a header width, a forward edge spanning the space between the outboard sides, a cutterbar arranged on the forward edge for severing crop from the ground, a transverse trough structure for guiding crop material movement laterally in the header, and a central opening for rearward discharge of the severed crop material from the header, the opening having a width substantially less than the header width, the conveying auger comprising:

an elongate central core supported by the header for rotation about an axis, the axis being generally transversely arranged on the header and co-extensive with the trough structure, said central core having a first end and a second end;

a first portion having left-handed flighting radially extending from said central core to define an outer diameter, said first portion axially extending along said core from a position adjacent to said first end and continuing inwardly along said central core;

a second portion having right-handed flighting radially extending from said central core to define an outer diameter generally equal to the outer diameter of said first portion, said second portion axially extending along said core from a position adjacent to said second end and continuing inwardly along said central core;

a central portion disposed along said central core between said first and second portions and generally co-extensive with the width of the discharge opening, said flighting from said first portion and said second portion extending axially and inwardly along said core to a central intersection, the radial extension of said flighting being tapered as the flighting approaches said central intersection.

2. The auger of claim 1, further comprising a first taper portion and a second taper portion, said first taper portion extending inwardly in a first direction from said first portion to an axial location along said first direction beyond said central intersection, said second taper portion extending inwardly in a second direction opposite to said first direction from said second portion to an axial location along said second direction beyond said central intersection thereby resulting in an overlap of said first and second taper portions at said central intersection.

3. The auger of claim 2, further comprising a minimum taper profile diameter located generally at said central intersection, and a taper ratio defined as the ratio of the minimum taper profile diameter to the outer diameter of said first and second portions, wherein said taper ratio is selected to optimize uniformity of the crop discharge from the header.

4. The apparatus of claim 3, wherein said taper ratio is approximately two to one.

5. The crop conveying auger of claim 1, wherein the specialty crop header is a grass seed header; and the opening for rearward discharge of the header located in the rearward portion of the header and laterally bounded by a pair of side edges of header vertically by a top edge of header and a bottom edge in a lower horizontal floor portion of the header.

6. In a agricultural harvesting header for severing crops from the ground, the header having generally opposing first and second side walls, a crop severing apparatus at a front edge of the header extending between the side walls, and a discharge zone having a width being defined by first and second edges, the discharge width being considerably less than that of the crop severing apparatus, and a crop conveying apparatus for transversely converging severed crop material from the width of the severing apparatus through the discharge zone and move the crop without conditioning, unobstructed rearward of the header, the improvement in the conveying apparatus comprising
  an elongate auger with a first end and a second end, said auger being rotatably connected to and supported by the header and extending generally between the first and second side walls;
  a left-hand flighting portion of said auger extending substantially between said first end and a point at least midway between said first and second edges of the discharge zone;
  a right-hand flighting portion of said auger extending substantially between said second end and at point at least midway between said first and second edges of the discharge zone;
  wherein said left-hand and right-hand flighting portions have a generally constant first outside diameter in an axial zone extending along the auger length from said first end to said first edge and from said second end to said second edge, and a variable outside diameter extending along the auger length from said first and second edges to at least a point mid-way between said first and second edges creating a tapered region between said first and second edges with a minimum diameter defined by the extension of the flighting occurring generally midway between said first and second edges.

7. The improvement of claim 6, further comprising a first taper portion and a second taper portion, said first taper portion extending inwardly in a first direction from said left-hand flighting portion to an axial location along said first direction at least midway between said first and second edges, said second taper portion extending inwardly in a second direction opposite to said first direction from said right-hand flighting portion to an axial location along said second direction at least midway between said first and second edges thereby resulting in an overlap of said first and second taper portions.

8. The improvement of claim 7, wherein the severed crop material is ejected from the discharge zone to form a windrow on the ground.

9. The improvement of claim 8, further comprising a minimum taper profile diameter located generally midway between said first and second edges, and a taper ratio defined as the ratio of the minimum taper profile diameter to the outer diameter of said first and second portions, wherein said taper ratio is selected to optimize uniformity of the crop discharge from the header.

10. The improvement of claim 9, wherein said taper ratio is approximately two to one.

11. A method for forming a windrow of a specialty, seed-bearing crop using a cutting header propelled by a crop harvesting machine comprising the steps providing a cutterbar transversely disposed across a forward edge of the header to sever standing crop material, the cutterbar defining a cutting width;
providing a discharge opening in the header for rearwardly ejecting severed crop material onto the ground, the discharge opening having a discharge width substantially less than the cutting width;
providing a transverse crop conveying auger for converging severed crop material from the cutting width to the discharge width, the transverse auger further comprising:
an elongate central core supported by the header for rotation about an axis, the central core having a first end and a second end;
a first portion having left-handed flighting radially extending from the central core to define an outer diameter, the first portion axially extending along the core from a position adjacent to the first end and continuing inwardly along the central core;
a second portion having right-handed flighting radially extending from the central core to define an outer diameter generally equal to the outer diameter of the first portion, the second portion axially extending along the core from a position adjacent to the second end and continuing inwardly along the central core;
a central portion disposed axially along the central core between the first and second portions and generally co-extensive with the width of the discharge opening, the flighting from said first portion and the second portion axially extending inwardly along the core to a central intersection, the radial extension of the flighting in the central portion being tapered as the flighting approaches the central intersection;
propelling the harvester across the ground to sever a standing crop, and
rotating the auger to gently convey severed crop material toward the discharge opening whereby the crop is deposited on the ground directly from the auger in the form of a generally uniform windrow.

12. The method of claim 11, wherein the auger further comprises a minimum taper profile diameter located generally at the central intersection, and a taper ratio defined as the ratio of the minimum taper profile diameter to the outer diameter of the first and second portions, wherein the taper ratio is selected to optimize uniformity of the crop discharge from the header.

13. The method of claim 12, wherein the taper ratio is selected to minimize dislodgement of seed from the crop.

14. The method of claim 13, wherein the taper ratio is approximately two to one.

* * * * *